Apr. 10, 1923.

A. WENDLING

CYCLE HANDLE

Filed July 14, 1921

1,451,411

Alexandre Wendling
INVENTOR
BY John C Alexander
ATTORNEY

Patented Apr. 10, 1923.

1,451,411

UNITED STATES PATENT OFFICE.

ALEXANDER WENDLING, OF DETROIT, MICHIGAN.

CYCLE HANDLE.

Application filed July 14, 1921. Serial No. 484,683.

*To all whom it may concern:*

Be it known that I, ALEXANDER WENDLING, a citizen of the United States, residing at Detroit, in the county of Wayne and State of Michigan, have invented certain new and useful Improvements in Cycle Handles, of which the following is a specification.

My invention relates to improvements in cycle handles, or rather an improved form of hand grip for the handle bar of a cycle, particularly a motor cycle.

An object is to provide an improved form of hand grip so constructed as to prevent the hand of the driver from being dislodged therefrom due to the jar and shock of travel on the road.

A further object is to provide a hand grip with a guard member adapted to encircle the driver's hand as it grasps the hand grip.

These and other objects together with details of construction, and advantages in operation, will more fully appear from the following description, appended claim and accompanying drawings, in which:

Figure 1:
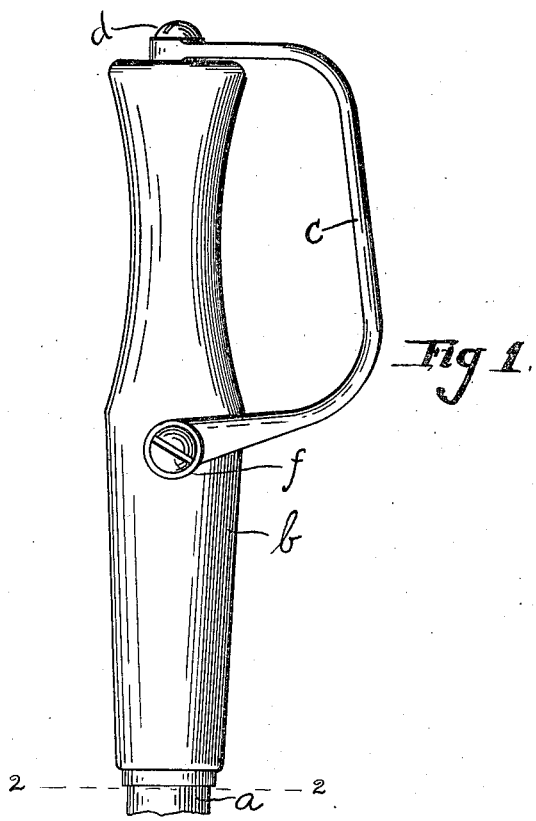
Fig. 1 is a side elevation showing my hand grip.
Figure 2:
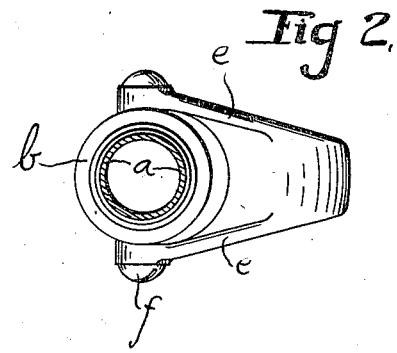
Fig. 2 is an end view of Fig. 1 showing the handle bar *a* in cross section.

This device is particularly intended as a hand grip for a motor cycle handle bar. In hard driving over rough roads the hand of the driver is frequently dislodged from the handle which may result in his losing control of the machine and injury to the driver. I therefore provide a hand guard adapted to encircle the hand to prevent such occurrence.

In the drawings, *a* indicates the tubular member forming the handle bar upon the end of which is mounted the hand grip member *b*, preferably shaped as shown to afford a convenient easily grasped hand grip.

I provide a guard member *c* bent substantially into the form of a U, one end of which is adapted to be fastened to the rear end of the hand grip by a screw or bolt *d*. This hand guard extends parallel to the handle and is attached thereto sufficiently forwardly of the rear end thereof so as to encircle the driver's hand.

The forward end of the hand guard is forked so as to straddle the hand grip. The forks are indicated as *e* and are secured to the handle by means of a bolt or other fastening member *f*.

In the construction of motor cycles it is common practice to so construct the hand grip that as the grip member is rotated about its longitudinal axis, control is exercised over the engine. This movement of rotation will serve merely to bring the hand guard well up on the hand to hold it firmly in place.

Having thus described my invention, what I claim is:

In a device of the class described, a hand grip, a hand guard secured at one end to the rear end of said hand grip, the opposite end of said hand guard forked so as to straddle said hand grip, means securing said forked end to said hand grip.

ALEXANDER WENDLING.

Witnesses:
MARY KENNEDY,
WALTER C. MARTLE.